UNITED STATES PATENT OFFICE.

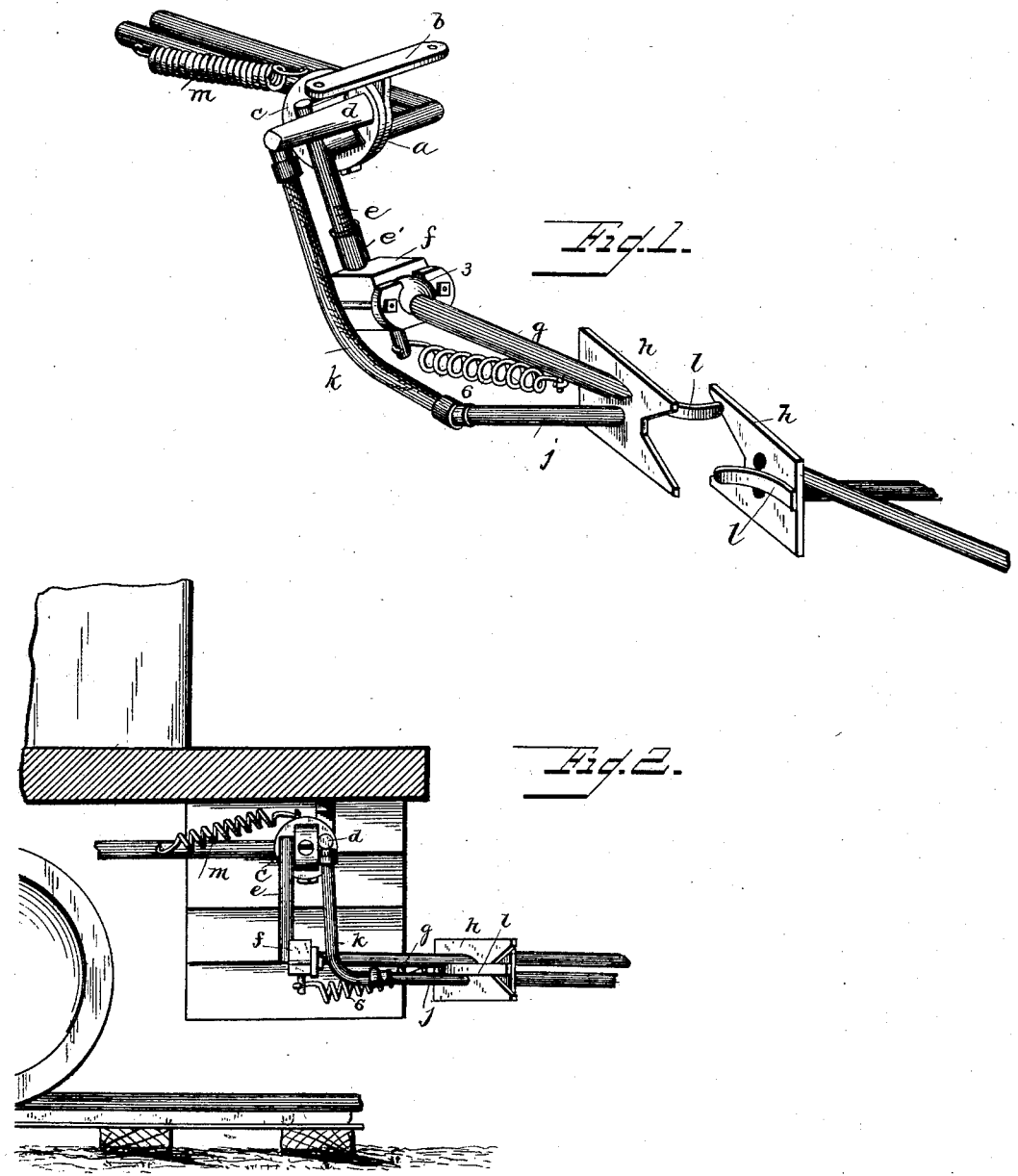

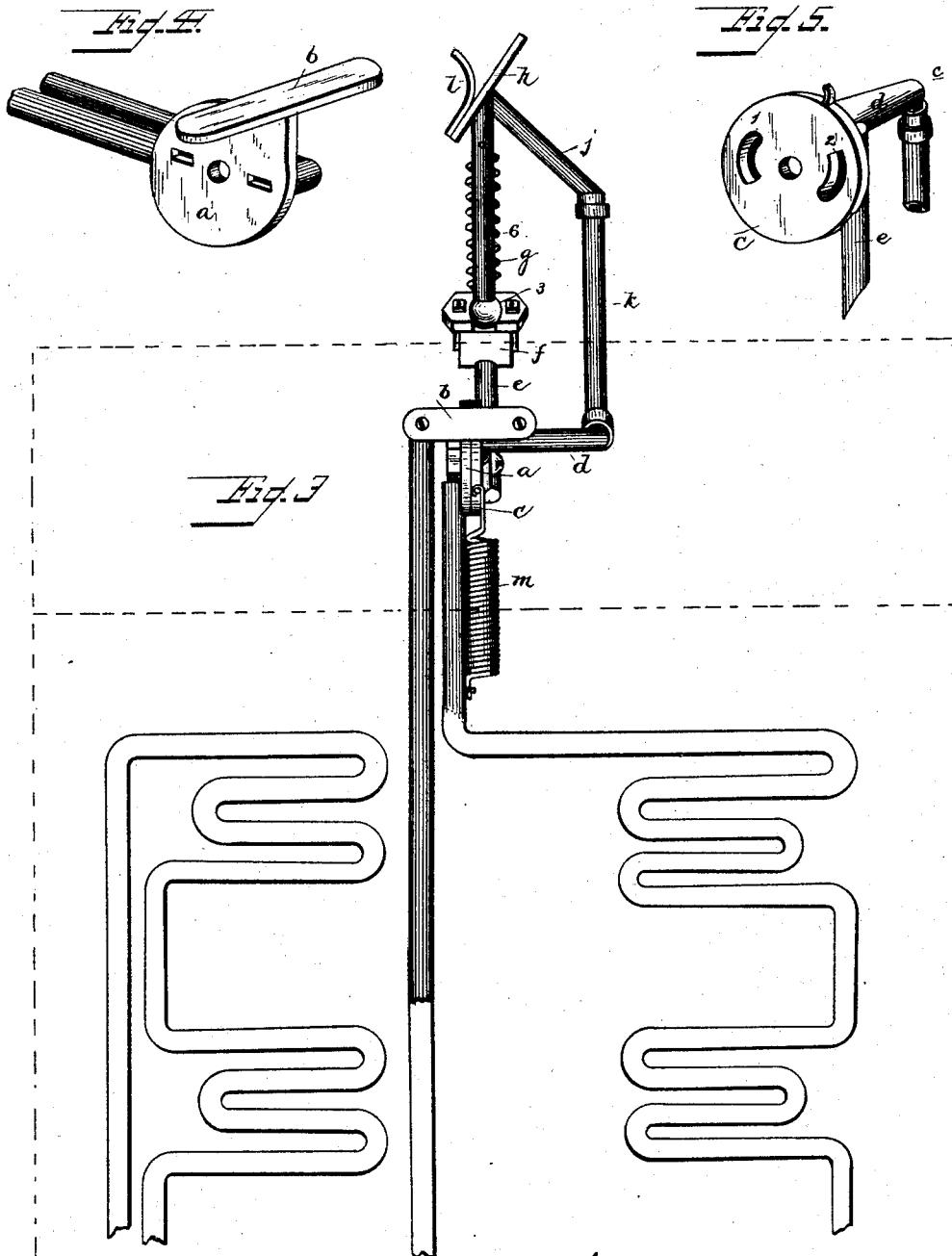

JOHN S. LASH, OF SUMMIT STATION, PENNSYLVANIA.

AUTOMATIC COUPLING DEVICE FOR CONNECTING HEAT OR POWER CONVEYING PIPES OF RAILWAY-CARS.

SPECIFICATION forming part of Letters Patent No. 364,527, dated June 7, 1887.

Application filed February 2, 1887. Serial No. 226,203. (No model.)

*To all whom it may concern:*

Be it known that I, JOHN S. LASH, a citizen of the United States, residing at Summit Station, in the county of Schuylkill and State of Pennsylvania, have invented certain new and useful Improvements in Automatic Coupling Devices for Connecting Heat or Power Conveying Pipes of Railway-Cars; and I do hereby declare the following to be a full, clear, and exact description of the invention, such as will enable others skilled in the art to which it appertains to make and use the same.

My invention relates to the heating and braking of railroad-trains, and its object is, primarily, to provide a construction and arrangement of parts for the heating of the cars by steam from the engine, and also for the transmission of air or liquid along the train for the application of the necessary power to the brakes.

A second essential object is to provide an automatic coupler for the transmitting-pipes, so that the pipes of each car may be connected and put in position for immediate use simply by the impact of two cars.

A further object is to entirely dispense with the objectionable heating of cars by stoves or heaters placed within the cars and adapted to burn coal or like fuel, and to provide a simple arrangement of pipes, in connection with the engine, for supplying the steam thereto, provided with valves and automatic coupling devices connecting with and operating the said valves.

The invention consists of heat and power conveying pipes for each car and an automatic coupling and uncoupling device for the ends of the pipes, whereby the pipes of adjoining cars may be coupled or uncoupled automatically.

Further, it consists in the devices and combination of devices hereinafter fully described, and particularly indicated in the claims.

In the accompanying drawings, illustrating one method of applying my invention best known to me, Figure 1 represents a perspective view of the automatic coupler and the connections with the air and steam pipes. Fig. 2 is a side elevation of the coupler and its connections with a portion of the distributing-pipes. Fig. 3 is a plan view showing the radiators in the car, the front platform being broken away to show the end connections. Figs. 4 and 5 are detail views of the valve between the fixed pipes and the end sections.

I desire it to be understood that while I have shown pipes for transmitting both heat and power to apply brakes, I do not limit myself in this connection, as it may be found desirable in certain climates and under certain conditions to dispense with one or the other; but this of course would not impair the usefulness of the other.

As shown in Fig. 3, I propose to arrange in each car at suitable intervals and at convenient locations radiators or pipes in connection with a pipe secured to the bottom of the car, or beneath the floor, or even beneath the seats, if desired, this being immaterial. This pipe or pipes is in connection with the engine which supplies steam heat in this manner to all the cars. It is necessary to provide couplings at the ends of these pipes for connection with the adjoining car, and as the cars are continually being changed, reversed, &c., it is very essential that these couplings be automatic, so as to add nothing to the difficulty of coupling and uncoupling cars. As the cars also have more or less independent motion, some freedom or flexibility is necessary in the end connections of the pipe or pipes, and all these requirements have been kept in view in the construction of the attachments and coupler now to be described.

Alongside of the steam-pipe I arrange another pipe in connection with the braking device and with the air-compressor in the engine or other source of suitable power for the braking of the train when desired by the engineer. These two pipes are combined with the same end connection and coupling.

A disk, $a$, is provided at each end of the car, at the termination of the air and steam pipes, and the passages in the said pipes are continued through the disk. To the top of this disk is secured a cross-bar, $b$, which is adapted to be secured to the bottom of the car and thus support the operating parts.

In close contact with the disk $a$ is a corresponding disk, $c$, held in place by a suitable bolt and nut and washer or in any other well-known manner. Openings are continued through the face of this disk, as shown in Fig. 5, adapted to register with the openings through the disk $a$. These openings are marked 1 and 2, and from the opening 1 a pipe, *d*, extends at right angles, while a pipe, *e*, extends from the other opening in a downward projection.

The pipe *e* serves as a support for a box, *f*, which has a socket adapted to receive the ball 3 of a pipe, *g*, a steam-tight joint being made and an opening through the ball and box to the supporting-pipe *e*.

The forward end of the pipe *g* supports a plate, *h*, fixed to the end thereof at an angle to its horizontal plane. This plate *h* has a pipe, *j*, extending from its rear face, and a rubber tubing, *k*, connects this pipe with the pipe *d*. Where the two pipes connect with the plate *h* passages are made in line therewith through to the outer face of the plate. The forward end of this plate is cut approximately V shape, with, preferably, a straight connecting portion at the base or end of the V. To the opposite end a tongue, *l*, is permanently secured in line with the space between the passages in the plate, which, as shown, lie side by side. This tongue is curved outward, so that its free end is about on a line with the forward walls of the passage-openings. This plate projects out beyond the line of the front platform, and with a corresponding plate upon the other car constitutes the coupling device for automatically placing the pipes of adjoining cars in communication with each other.

It may be said here that as cars of different roads vary very materially in regard to the distance of the platform from the ground, it is essential that some means be provided whereby the couplers will connect with each other, no matter how much variation there may be in the height of cars. To this end I make the pipe *e* extensible by means of a sleeve, *e'*, as shown, so that I can adjust the coupler and locate it on every car a specified distance from the rail, so that in this way a uniform position relative to other cars may be secured.

As explained, the couplings at each end of the car are alike, and as they are in the same horizontal plane as two cars approach, the correspondingly-inclined faces of the plates *h h* approach each other, as on Fig. 1, and, by means of the V-shaped notches and tongue *l*, are guided accurately to their seats, thus registering the openings in the face of one with those in the face of the other.

In order to keep the pipes of each car closed during the time they are not in need, I secure a spring, *m*, at one end to one of the main pipes, and the other end to a pin on the periphery of the disk *c*, and the resistance of this spring throws the openings in the disk out of line with the openings in the disk *a*, and thus there is no communication with the outside air. The rubber tubing *k* permits the disk to have the necessary freedom of movement. The plate *h* and its supporting-arm *g* are connected to the arm *e*, and when two plates come in contact, as in the connection with another car, this action will force both plates and their connecting supporting-pipes inward beneath their respective cars, and this will cause the disks *c* to swing forward upon their bearing-pin, which will bring the openings in the disks *a* and *c* to register, and the connection will be made between the two cars. It will be understood that these parts must be arranged relatively to the coupling between the cars, so that when the cars are properly held by their couplings the openings of the disk-valves are properly registering. Thus it will be seen that the parts are held in proper position against spring-pressure, and the moment the cars are uncoupled for any reason the plates *h h* immediately separate and the openings in the disks will be thrown out of line.

In order to allow for the independent movements of the cars, as in going around curves and passing over rough roads, &c., I have formed the pipe *g* with a ball end fitting in a socket, and this pipe is held under spring tension by a spring, 6, secured at one end to the pipe and at the other to a pin on the socket. This construction allows the parts of adjoining cars in contact to have considerable freedom of movement without interfering with the proper action of the parts. The rubber section *k* of the other pipe permits this movement without injurious results. Instead of air it will be understood that any pressure medium may be used.

The details of construction of the invention may be changed in many ways without departing from the spirit thereof.

It will be observed that this mode of construction permits the use of superheated steam to warm the cars, because the steam-pipe connection between the cars can be made entirely of metal, and there would be no rubber tubing to be injured by the hot steam.

Having thus described my invention, what I claim is—

1. The described apparatus, consisting of conveying-pipes for heat and power, a disk connecting said pipes provided with passages through the same, a disk-valve pivoted to the first disk, and also provided with passages adapted to register with the openings through the fixed disk, an automatic coupling and uncoupling device, and pipes connected to the movable disk and leading to the couplings, the movable disk being under spring tension and operating through the coupling or uncoupling of the cars to open and close the connection with the pipes, substantially as described.

2. The combination, in the described apparatus, of the conveying-pipes, the automatic coupling device and pivoted disk, the valve interposed between the coupling and the pipes proper, said valve being adapted to automatically open and close when the car is coupled to or uncoupled from another car.

3. In the described apparatus, the pipe or pipes, the disk-valves held under tension by a suitable spring, and the inclined plate *h*, having pipes leading thereto, adapted to a corresponding plate on the adjoining car.

4. In the described apparatus, the coupling-plate $h$, having openings through its face in connection with pipes, said plate having the V-shaped notch in one end and tongue $l$ on the opposite end, substantially as described.

5. In combination with conveying-pipes, the disks $a$ and $c$, the pipe $e$, connected to the disk $c$, the plate $h$, and the universal connection between the plate and pipe, substantially as described.

6. In combination with the pipes and disks, the plate $h$ and its connections, and the extensible supporting-pipe $e$, substantially as described.

7. In combination with the main pipes, the pipe $e$, the disk $c$, connected therewith, the plate $h$, the pipe $g$, connected to pipe $e$ by ball-and-socket joint, and the spring for the same, substantially as described.

In testimony whereof I hereby affix my signature in presence of two witnesses.

JOHN S. LASH.

Witnesses:
JOHN H. PHILLIPS,
ROBERT H. SMITH.